Feb. 14, 1928.

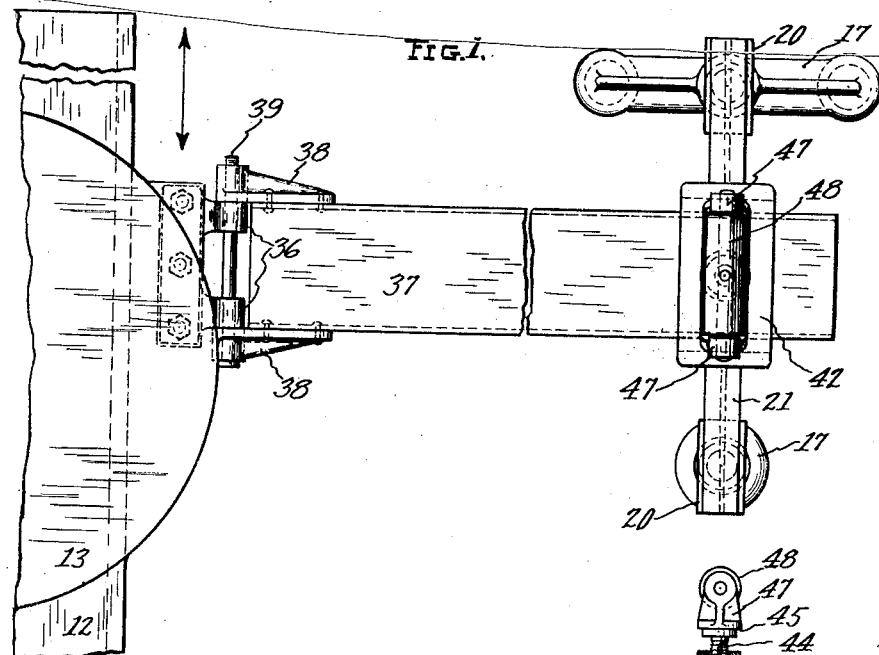
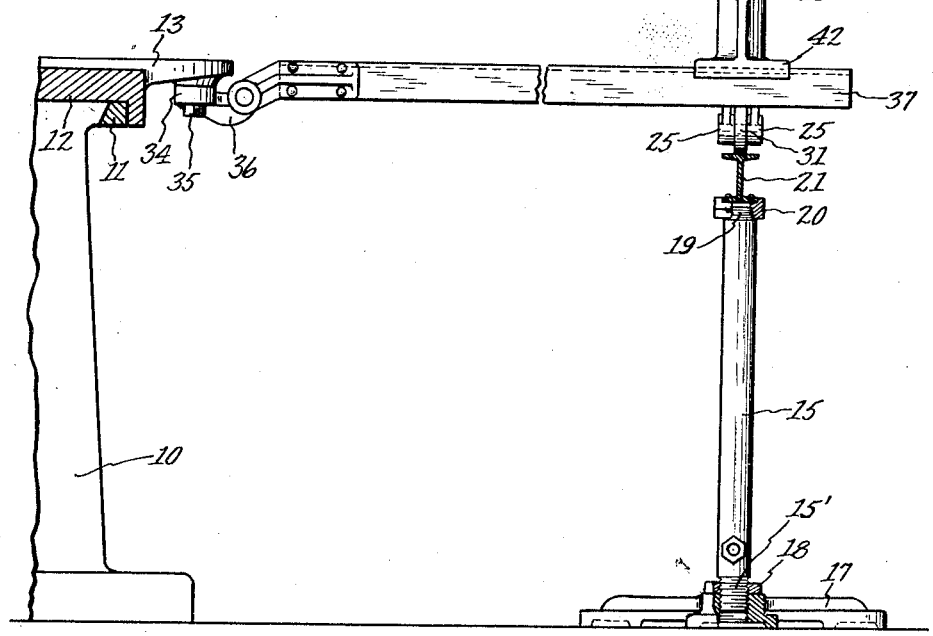

H. H. YERK ET AL 1,658,826

WORK SUPPORTING FIXTURE

Filed Oct. 2, 1925

2 Sheets-Sheet 2

INVENTOR
H.H. Yerk
W. J. Baumberger
Lloyd L. Evans ATTORNEY

Patented Feb. 14, 1928.

1,658,826

UNITED STATES PATENT OFFICE.

HENRY H. YERK AND WILLIAM J. BAUMBERGER, OF DAVENPORT, IOWA, ASSIGNORS TO MICRO MACHINE COMPANY, OF BETTENDORF, IOWA, A CORPORATION OF IOWA.

WORK-SUPPORTING FIXTURE.

Application filed October 2, 1925. Serial No. 59,980.

This invention relates to work supporting holders for grinding machines, and more especially to devices for supporting the overhanging end of a class of heavy work which is fixed upon a reciprocable grinding machine table.

In grinding heavy articles, such as railroad side rods and the like, which are of a form such that when secured upon a reciprocating grinding machine table an end will project beyond the side of the machine, an auxiliary support must necessarily be provided so that work will be maintained in proper relation with the grinding tool. It has been the practice to provide a movable gib crane, adjacent the grinding machine from which the overhanging end of work is suspended so that it will be moved with the grinding machine table. Due to the weight of the overhanging portion of the work suspended in such manner, the inertia to be overcome is excessive and causes a jerky movement of the crane as it moves with the grinding machine table. The jerky movement is transmitted through the work to the grinding machine, causing misalignment of the work and vibration of the grinding machine and tool, so that the bore can not be accurately finished within small limits.

An object of our invention is to provide an auxiliary work supporting device upon which the projecting end of a heavy article can be supported so that it will move uniformly with the grinding machine table upon which the portion of the work to be ground is secured.

A further object of our invention is to provide an auxiliary work supporting device which is located at one side of a grinding machine and includes a movable anti-friction mounted bracket upon which an end of work projecting from the reciprocating table of the machine can rest and be moved uniformly with the portion of the work secured upon the reciprocating table.

Another object of our invention is to provide an auxiliary work supporting device to be located at one side of a grinding machine having a vertically adjustable movable work rest upon which the end of work overhanging the machine can be supported in desired elevation to move in unison with the reciprocating work supporting table of the machine.

Other objects of the invention will be apparent to those skilled in the art to which our invention relates by reference to the accompanying drawings taken in connection with the following description.

Figure 3:
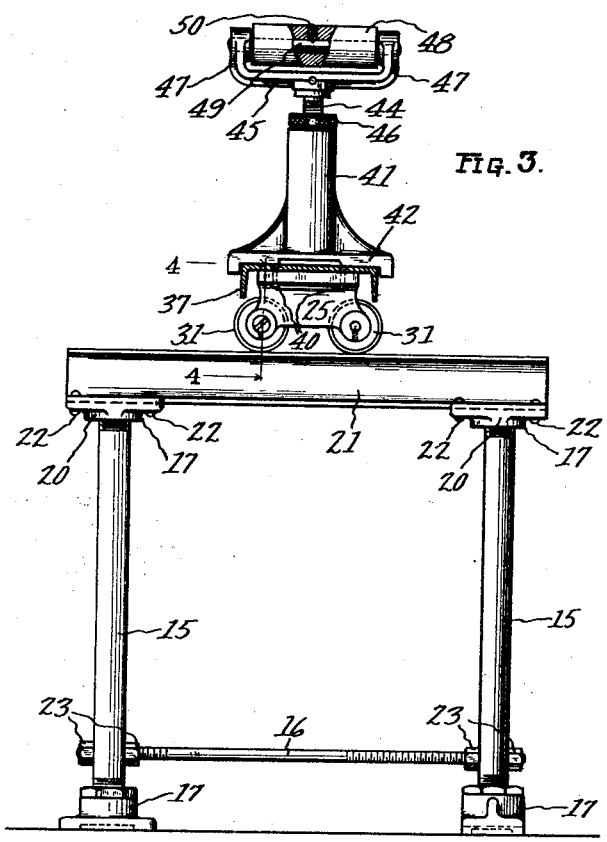
Figure 4:
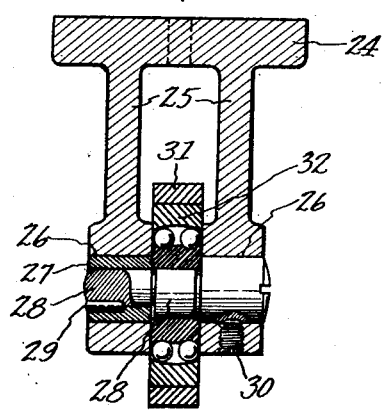

In the drawings, Figure 1 is a plan view of a device embodying our invention, associated with a grinding machine; Fig. 2 is a vertical sectional view of the same taken on line 2—2 of Fig. 1; Fig. 3 is an end elevation of the device; and Fig. 4, is a sectional view, taken on line 4—4 of Fig. 3, showing the carrier.

Referring to the drawings by characters of reference, 10 represents the frame of a grinding machine having a bed portion 11 upon which a work supporting table 12 is reciprocated longitudinally of the machine. The table is formed with a supporting platform 13 which carries therewith the fixture to which work to be finished is secured in proper alignment with a grinder. It will be understood that the machine shown is of a conventional type used for accurately finishing bores in work, the machine being preferably of the type disclosed in the Joseph Patent 1,600,947, wherein the grinding wheel spindle is rotatable on its own axis and also in an orbital path about an axis eccentric to its own. Our invention is associated with machines of such a general character, and provides a support for the ends of heavy work in the nature of railroad side rods, and the like, which project beyond the side of the machine when secured upon the reciprocating table in position for a finishing operation.

The supporting device includes a relatively stationary supporting frame consisting of tubular standards 15, held in spaced relation by a brace rod 16. The supporting device is placed adjacent one side of the machine from which the end of work extends. The lower ends 15' of the standards are threaded externally and are screwed into foot members 17, and suitable nuts 18 are screwed on the standards against the feet to secure them in desired vertical adjustment. The upper ends 19 of the standards are threaded and supporting brackets 20 are screwed thereon. The brackets 20 are provided with a grooved upper face, and the grooves are arranged in alignment parallel with the grinding machine to receive the rail member 21. The rail member is rigidly secured to the brackets by suitable means, such as rivets 22, which extend through the base flanges thereof. The rod 16 is threaded at each end and extends through the standards, and nuts 23 are screwed thereon on each side of and against the standards.

A carrier is movably mounted upon the top of the rail 21. The carrier frame is formed preferably as an integral casting, having a base portion 24 from which spaced legs 25 depend. The lower portions of the legs are provided with aligned apertures 26, adjacent each end, and a bushing 27 is pressed into one of the aligned apertures. A shaft 28 extends through each of the pairs of aligned apertures at the ends of the legs and one of their ends is carried within the sleeve bushings and secured therewith by the pins 29, while the other end of the shafts are keyed to the leg through which they extend by set screws 30. A wheel 31 is carried by each shaft 28 intermediate the legs 25, and are each carried on the shafts by a pair of races 32 having ball bearings mounted therebetween. The shaft 28 is shown to have an eccentric mounting for the wheel 31 whereby said wheel may be adjustably disposed relative to the base portion 24.

A bracket 34 is secured by bolts 35 to one side of the table platform 13 of the grinding machine, and spaced hinged arms 36 extend therefrom. A platform or span member 37, preferably an inverted channel, extends transversely from the side of the machine and hinge arms 38 are riveted to the sides of the platform and project beyond the ends thereof. The hinge arms of the platform 37 and the bracket 34 are hinged together by the pintle pin 39. It will be seen that the platform 37 is connected with the reciprocating platform of the grinding machine and can be swung in a vertical plane relative thereto. The platform 37 is secured by rivets 40 upon the base portion 24 of the carrier, and it will be seen that the reciprocation of the table of the machine will cause the platform 37 and its supporting carrier to move therewith, and the carrier provides an anti-friction support for the platform 37 upon the rail 21 of the relatively stationary supporting frame.

A standard 41 is carried upon the platform or span member 37 and the base portion 42 thereof is formed to fit over and slide upon the platform. The upper end of the standard is provided with a vertically extending aperture 43 in which the threaded stem 44 of the work supporting frame 45 is screwed. A nut 46 is screwed on the stem 44 to engage the bracket and retain the frame 45 in vertical adjusted relation therewith. Arms 47 extend upwardly from the frame 45, and a roller 48 extends therebetween and is secured to a shaft 49, by a set screw 50, which is mounted in apertures in the arms. The projecting end of the work secured upon the platform of the grinding machine rests upon the roller 48 and can be readily moved thereon transversely of the machine. The weight of the projecting end of a railroad side rod, or the like, is sufficient to maintain it in a stationary position on the roller when positioned. The frame 45 can be screwed up or down in the standard 41 to adjust the vertical elevation of the projecting end of the work to be ground, and the bracket 41 can be moved upon the table 37 transversely of the grinding machine to accommodate work of different length.

It will be seen that the device described provides a rigid support, upon which work can be carried uniformly with the griding machine table. The rollers 31 provide an anti-friction mounting for the platform or span member 37 upon a rigid support, so that there is a minimum inertia to overcome when the projecting end of work carried thereby is moved. The heavy projecting end of the work will travel uniformly and smoothly with the portion thereof fixed to the grinding machine, and the work when set in position to be finished by a grinding tool will remain so during the feeding movements. It will also be seen that the device is adjustable, permitting the work to be readily positioned into described relation for the finishing operation.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. Means for supporting projecting portions of work secured to a reciprocable work table of a machine tool, said means comprising, in combination, a supporting frame spaced from said machine tool and having a flat surface extending parallel to the direction of said table reciprocation, a span member secured at one end to said table and extending to said supporting frame in a direction transversely of the direction of said table reciprocation, rolling means carried by said span member, said rolling means being arranged to roll on said supporting frame flat surface and longitudinally thereof, a work supporting member carried by said span member and adjustable longitudinally of said span member, and a roller carried by said work supporting member for readily obtaining supporting contact with the work, said work supporting member being thereby arranged to cooperate with and support continuously an outwardly extending portion of work during said reciprocation of said work table, whereby the entire piece of work may be reciprocated smoothly and without jerky movement.

2. Means for supporting projecting portions of work secured to a reciprocable work table of a machine tool, said means comprising, in combination, a supporting frame spaced from said machine tool and having a flat surface extending parallel to the direction of said table reciprocation, a span member secured at one end to said table and extending to said supporting frame in a direction transversely of the direction of said table reciprocation, rolling means carried by said span member, said rolling means being arranged to roll on said supporting frame flat surface and longitudinally thereof, and a work supporting member carried by said span member and adjustable longitudinally thereof, whereby pieces of work of various sizes and shapes may be readily supported, said work supporting member being arranged to cooperate with and support continuously an outwardly extending portion of work during said reciprocation of said work table, whereby the entire piece of work may be reciprocated smoothly and without jerky movement.

3. Means for supporting projecting portions of work secured to a reciprocable work table of a machine tool, said means comprising, in combination, a supporting frame spaced from said machine tool and having a flat surface extending parallel to the direction of said table reciprocation, a span member secured at one end to said table by a hinge connection having a horizontal pintle, said span member extending to said supporting frame in a direction transversely of the direction of said table reciprocation, rolling means carried by said span member, said rolling means being arranged to roll on said supporting frame flat surface and longitudinally thereof, and a vertically adjustable work supporting member carried by said span member, said work supporting member being arranged to cooperate with and support continuously an outwardly extending portion of work during said reciprocation of said work table, whereby the entire piece of work may be reciprocated smoothly and without jerky movement.

4. Means for supporting projecting portions of work secured to a reciprocable work table of a machine tool, said means comprising, in combination, a supporting frame spaced from said machine tool and having a flat surface extending parallel to the direction of said table reciprocation, a span member secured at one end to said table and extending to said supporting frame in a direction transversely of the direction of said table reciprocation, rolling means carried by said span member, said rolling means being arranged to roll on said supporting frame flat surface and longitudinally thereof, and a vertically adjustable work supporting member carried by said span member, said work supporting member being also adjustable longitudinally of said span member, whereby pieces of work of various sizes and shapes may be readily supported, said work supporting member being arranged to cooperate with and support continuously an outwardly extending portion of work during said reciprocation of said work table, whereby the entire piece of work may be reciprocated smoothly and without jerky movement.

5. Means for supporting projecting portions of work secured to a reciprocable work table of a machine tool, said means comprising, in combination, a supporting frame spaced from said machine tool and having a flat surface extending parallel to the direction of said table reciprocation, a span member secured at one end to said table and extending to said supporting frame in a direction transversely of the direction of said table reciprocation, rolling means carried by said span member, said rolling means being arranged to roll on said supporting frame flat surface and longitudinally thereof, and work supporting means carried by said span member arranged to support work from any desired portion longitudinally of said span member, whereby pieces of work of various sizes and shapes may be readily supported, said work supporting means being arranged to cooperate with and support continuously an outwardly extending portion of work during said reciprocation of said work table, whereby the entire piece of work may be reciprocated smoothly and without jerky movement.

6. Means for supporting projecting portions of work secured to a reciprocable work table of a machine tool, said means comprising, in combination, a supporting frame spaced from said machine tool and having a flat surface extending parallel to the direction of said table reciprocation, a span member secured at one end to said table by a hinge connection permitting hinged movement of said span member in a vertical plane, said span member extending to said supporting frame in a direction transversely of the direction of said table reciprocation, rolling means carried by said span member, said rolling means being arranged to roll on said supporting frame flat surface and longitudinaly thereof, and work supporting means carried by said span member arranged to support work from any desired portion longitudinally of said span member.

In testimony whereof we affix our signatures.

HENRY H. YERK.
WILLIAM J. BAUMBERGER.